United States Patent
Doragh et al.

[11] Patent Number: 6,115,815
[45] Date of Patent: *Sep. 5, 2000

[54] BOOT DRIVE SELECTION AND HIBERNATION FILE DETECTION

[75] Inventors: Philip H. Doragh, Cypress; William C. Hallowell, Spring, both of Tex.

[73] Assignee: Compaq Computer Corporation, Houston, Tex.

[*] Notice: This patent is subject to a terminal disclaimer.

[21] Appl. No.: 09/167,849

[22] Filed: Oct. 7, 1998

Related U.S. Application Data

[63] Continuation of application No. 08/684,582, Jul. 19, 1996, Pat. No. 5,822,582.

[51] Int. Cl.⁷ ........................................ G06F 9/06
[52] U.S. Cl. .................................. 713/2; 709/301
[58] Field of Search .................... 713/100, 2, 1; 710/173, 8–10; 709/301, 300, 220–222; 707/200; 717/11; 714/7, 36, 707

[56] References Cited

U.S. PATENT DOCUMENTS

| | | | |
|---|---|---|---|
| 5,210,875 | 5/1993 | Bealkowski et al. | 713/2 |
| 5,257,378 | 10/1993 | Sideserf et al. | 395/700 |
| 5,274,816 | 12/1993 | Oka | 713/2 |
| 5,448,741 | 9/1995 | Oka | 713/2 |
| 5,537,636 | 7/1996 | Uchida et al. | 707/200 |

(List continued on next page.)

OTHER PUBLICATIONS

*Intel 486 SL Microprocessor SuperSet Programmer's Reference Manual*, Intel Corp., Nov., 1992, pp. 6–28—6–53.
*I²C Spec. Information—The I²C Bus and how to use it (including specifications)*, Philips Semiconductors, 1993.
*System Management Bus Specifications*, Rev. 0.95, Intel Corp., Apr. 21, 1994.
*Charge NiCd and NiMH Batteries Properly*, Ron Cates et al., Electronic Design, Jun. 10, 1996, pp. 118, 120, 122.
*Part 2: Batteries—Power Technologies*, EET Special Edition. Elec. Eng. Times, Apr. 8, 1996, pp. 39–82.

Primary Examiner—Joseph E. Palys
Assistant Examiner—Rijue Mai
Attorney, Agent, or Firm—Akin, Gump, Strauss, Hauer & Feld, LLP

[57] ABSTRACT

A multi-boot apparatus allows a portable computer to boot from a predetermined list of bootable data storage devices, even if the data storage devices have been relocated during operation. The computer system has a hard disk bay and multi-bay for accepting one or more data storage devices and/or battery packs. During initialization, the invention retrieves a previously entered IPL sequence from a configuration setup table stored in the nonvolatile RAM of the portable computer. Next, the invention queries each bay and determines the device connected to each bay, including the data storage device and the battery pack, if one is present. The invention then determines if a remapping of the data storage drives is necessary to ensure that the device at the beginning of the IPL order is the first drive in the BIOS boot sequence. If so, the invention remaps the drives such that the device is at the first drive in the BIOS boot sequence. After booting, the invention allows the user to modify the IPL sequence using a plug and play application programming interface (PnP API) and to enable/disable the multi-boot functionality if so desired. The invention also determines the disk drive containing a hibernation file by assuming that the hibernation file will reside on the disk in the hard-disk bay because of the chance that the disk will be removed is less than that of a disk located in one of the multi-bay. Thus, by treating the hard disk bay and the multi-bay as devices in accordance with the predetermined IPL order and by performing automatic device sensing and remapping if necessary, the present invention allows the user to dynamically insert and remove data storage devices without requiring the user to update the IPL order.

10 Claims, 7 Drawing Sheets

U.S. PATENT DOCUMENTS

| | | | |
|---|---|---|---|
| 5,680,556 | 10/1997 | Begun et al. | 710/131 |
| 5,715,456 | 2/1998 | Bennett et al. | 713/2 |
| 5,727,213 | 3/1998 | Vander Kamp et al. | 709/301 |
| 5,787,491 | 7/1998 | Merkin et al. | 711/173 |
| 5,815,705 | 9/1998 | Slivka et al. | 713/2 |
| 5,819,087 | 10/1998 | Le et al. | 713/2 |
| 5,822,582 | 10/1998 | Doragh et al. | 713/2 |
| 5,860,001 | 1/1999 | Cromer et al. | 713/1 |
| 5,999,989 | 12/1999 | Patel | 710/1 |

BOOT DRIVE SELECTION AND HIBERNATION FILE DETECTION

This application is a continuation of Ser. No. 08/684,582 filed Jul. 19, 1996 now U.S. Pat. No. 5,822,582.

BACKGROUND OF THE INVENTION

1. Field of the Invention

The present invention relates generally to an apparatus and a method for booting a computer, and more particularly, to an apparatus and a method for locating a hibernation file and selecting a boot drive in a computer with multiple-bays for supporting data storage drives.

2. Description of the Related Art

The decade of the nineties, aptly labeled the information age, saw the acceptance of personal computers in numerous mainstream applications. The proliferation of personal computers in the nineties was driven in part by the ever-increasing performance of the processor and the downwardly spiraling prices of personal computers. This trend was further accelerated with the development of portable computers which offered mobile computing capability. Lightweight, yet powerful mobile computers such as portables, luggables, laptops, notebooks, palm tops and personal digital assistants provided the processing capability needed for mobile processing of many computer intensive applications, including computer-aided design, three-dimensional animation and multimedia presentation. These applications typically required the portable computer to support a large capacity disk drive for spooling video images and/or a compact disk read only memory (CD-ROM) for high capacity non-volatile data storage. Furthermore, as certain applications such as slide presentations may be lengthy but not data storage intensive, it may desirable to have more battery packs to support a longer operating period when alternating current (AC) power is not available.

Although portable computer users desired both a large data storage capacity and a long operating period, limits such as weight, space and power consumption restrictions imposed by the physical structure of the portable computer limited the user to only specific data storage device and battery pack combinations. As each application is unique in term of its requirements for data storage capacity, CD-ROM availability, and battery operating period, the standard portable computer design was inadequate for all applications.

One solution to this problem was provided by the Compaq LTE-5000 portable computer. The Compaq LTE-5000 portable computer offered multiple bays accommodating a variety of LTE-5000 compatible expansion packs. These packs included additional disk drives, CD-ROM players and/or battery packs. These portable computers offered the user the flexibility of customizing the portable computer for specific applications. For instance, in applications requiring multimedia presentations, one of the bays could be configured for a CD-ROM. Alternatively, in the event that the user is running data intensive applications such as CAD application which require high speed and large capacity disk storage systems, the user can simply insert one or more additional disk drives into the bay slots. Alternatively, in the event that the user wishes to maximize his or her mobile computing time, the portable computer may be equipped with a plurality of battery packs which extend the operating period for the user.

In the event that more than one bootable data storage drive had been inserted in the bays, users desired the ability to specify the particular drive to boot from as well as the booting sequence of the drives. The multiple data storage drive boot (multi-boot) selection process for drives that may be mounted or dismounted on the fly necessitated certain changes to the traditional IBM PC compatible Basic Input/Output System (BIOS) routine which served as an interface between high level system calls and the low level machine language routines which controlled the hardware.

In a standard IBM compatible personal computer, the BIOS software supported a primary Intelligent Drive Electronics (IDE) channel interface having a number of I/O ports accessible via a task file interface: 01F0h (data port, 16 bits), 01F1h–01F7h (command and status port, 8-bit access only), and 03F6h–03F7h (reset drive and alternate status, 8-bit access only). Additionally, a second channel with IDE ports located at 0170h–01Fh and 0376h–0377h was supported by the standard BIOS. To individually select the register ports, each channel provided chip select signals CS1 to decode registers located at I/O addresses 01FXh and 017Xh of the task file register and CS3 to further decode the respective data and control registers residing at I/O addresses 03F6h–03F7h and 0376h–0377h of the task file register. In such systems, BIOS accesses to the floppy and hard disk drives were performed via an interrupt function called INT 13 which supported functions such as initialize drive, read status of previous operation, read/write/verify sectors, format track, determine drive parameters such as disk type/disk change, and format the floppy diskette. In the interrupt 13, the first floppy drive (A:) was assigned to the drive number 00H and the second floppy disk drive was assigned the number 01H. Similarly, the first hard disk was assigned to number 80h and the second number hard drive was assigned to 81h. In addition to INT 13, a second class of interrupt function known as INT 19 was supported by the BIOS and caused a warm boot to occur when invoked. The warm boot of INT 19 only reloaded the operating system and bypassed the check on the condition of the hardware components such the memory and interrupt controllers, among others.

In the Compaq LTE-5000, in the event that multiple bootable data storage devices were inserted in the bays, the user determined the booting order by specifying an initial program load (IPL) sequence into a non-volatile system setup memory (NV-RAM) during a computer setup phase prior to the first boot sequence. The IPL sequence is a linked list serially linking the drives in the order that they are to boot. The IPL data storage structure further storing drive boot characteristics such whether the drive is a CD-ROM player, a hard disk drive or a floppy drive. Further statistics such as the storage capacity of each drive are also stored in the IPL data storage structure.

The Compaq LTE-5000 conformed to the BIOS boot specification version 1.0, available from Compaq Corporation and Phoenix Corporation. The BIOS boot specification version 1.0 allowed the user to specify an IPL order which included the first hard disk, the first CD-ROM drive or the first floppy drive. The Compaq LTE-5000 multi-boot functionality was achieved by redefining the first hard disk in the IPL order as the BIOS INT 13 drive located at I/O address 80h, regardless of the drive's IDE channel and IDE device status.

Although the BIOS version 1.0 specification was adequate for a desktop computer where the location and number of the data storage devices were fairly static, the limitation was particularly inconvenient for portable computers with multi-bay capability, as the BIOS boot specification required the user to reestablish the IPL order or sequence every time he or she changed any device in the multi-bay portable computer. Additionally, the specific redefinition of the first hard disk in the IPL order as the BIOS INT 13 drive located at 80h was overly restrictive.

The ability to transparently swap drives and specify the particular drive to boot from was desirable for a number of reasons, namely (1) the user might wish to transfer the hard drive from another portable computer that he or she previously operated; or (2) the user might wish to have different hard drives booting up different operating systems, including one hard drive for Windows 3.1™, one hard drive for Windows 95™ and one hard drive for Windows-NT™. Thus, it is desirable that data storage devices be swappable without requiring the user to reestablish the IPL order or sequence every time he or she changed a device in any bay of the portable computer.

On a related issue, one problem associated with battery powered portable computer systems is the operating period per set of batteries. Although portable computer users prefer long operating time between battery recharge or replacement operations, the weight and space limits imposed by the physical structure of the portable computer provide a natural limit to the operating period that a set of battery can support. One solution for reducing the power consumption of a portable computer system, particularly when the system is not in use, is provided by portable computers which use a suspend capability incorporated in Intel's 486™ SL microprocessor. The suspend hardware allows the system to power-off with an application running after a predetermined period of user inactivity and resume the application transparently when the user resumes operating the portable computer. In accordance with the Intel 486™ SL data sheet, the suspend mode is the maximum power saving mode as it eliminates all power usage except that required to retain the state of the computer system before power is removed. In the Intel system, before causing the computer system to enter the suspended mode, a suspend request handler saves the state of the computer memory such that the computer can return to the before the power down operation. In addition, register contents of the processor and peripheral components such as the 82360SL I/O chip need to be extracted from the components and saved either in a nonvolatile RAM or in a disk drive because the contents of these registers may be overwritten by a system management interrupt handler for resuming operation on the portable computer. Thus, for example, the 82360SL I/O chip contains certain standard ISA peripheral controllers, some of which have only write-only registers. For compatibility reasons, these registers cannot be modified. Therefore, these registers are shadowed in the 82360SL I/O chip such that their states can be accurately restored in the resume function. Thus, in addition to primary memory contents, the suspend code has to save the state of the registers of the processor as well as support chips for the resumption of processing when the computer is waked up.

In the event that the system is in suspension, activities directed at the computer, such as the assertion of the suspend/resume button pin or the opening of the lid of the computer, initiate a resume operation to remove the computer system from its suspend state. When a resume operation is initiated, the 82360SL chip restarts the CPU clock and causes a soft reset. During warm-boot, by examining the suspend status bit, the system BIOS can determine if a reset had been caused by a resume event. If the suspend status bit is set, the reset is a resume reset and control should be passed to the system management interrupt handler. In this manner, in the Intel 486™ SL, information saved by nonvolatile memory before the suspend operation is used by the SMI handler to restore the system to its original state prior to suspend.

Since the Intel 486™ SL specification, computer vendors have added a variation known as hibernation where the contents of memory as well as the support chips and the registers are stored in a disk file known as a hibernation file rather than in a nonvolatile memory. The ability to store the hibernation file in the disk drive allows much larger system configurations to be stored, such as much larger DRAM size, high resolution video memory, and related information to be economically stored in the computer systems already available disk drive. By using the disk drive in place of the non-volatile RAM, the computer system can hibernate even if memory intensive applications are loaded into memory. Further, by using an existing disk drive rather than adding an expensive non-volatile memory devices, the price of the computer system is kept minimal.

In conventional portable computers where the data storage devices are static in position, the hibernation file can simply be stored in the primary hard disk data storage device. However, in portable computers with the multi-bay capability, it is possible that the data storage device containing the hibernation file be removed and inserted in a different bay. Such an occurrence would be highly undesirable as the portable computer would be unable to locate the hibernation file necessary to restore the portable computer back to its pre-suspend state. In such an event, the user may lose his or her data after the portable computer exits its hibernation process.

SUMMARY OF THE INVENTION

The present invention allows the portable computer to boot from a predetermined list of bootable data storage devices in a computer system even if the data storage devices have been relocated during operation. The computer system has a disk bay for preferably accepting a hard disk drive and a multi-bay for accepting one or more data storage devices such as floppy drives, hard disk drives, CD-ROM players and/or battery packs. During initialization, the invention retrieves a previously entered IPL sequence from a configuration setup table stored in the nonvolatile RAM of the portable computer. Next, the invention queries each bay and determines the device connected to each bay, including the data storage device and the battery pack, if one is present. This is accomplished by determining the presence of a device and the IDE channel and the IDE device master/slave status for the particular bay. The present invention then attempts to communicate with the IDE controller mapped to the particular IDE channel and the master/slave information. If the IDE controller fails to respond, the present invention notes that the device is a floppy device. Alternatively, if the IDE controller responds according to the IDE specification, the present invention further determines whether or not the device is an Advanced Technology Attachment (ATA) device or an Advanced Technology Attachment Packet Interface (ATAPI) device. In the event that the device is an ATAPI device, the invention makes a further distinction by testing if the device is an ATAPI CD-ROM or an ATAPI floppy device. The invention then determines if a remapping of the data storage drives is necessary to ensure that the device at the beginning of the IPL order is the first drive in the BIOS boot sequence. If so, the invention remaps the drives such that device is at the first drive in the BIOS boot sequence.

After booting, the invention allows the user to modify the IPL sequence using a plug and play application programming interface (PnP API) and to enable/disable the multi-boot functionality if so desired. The invention also determines the disk drive containing a hibernation file by assuming that the hibernation file will reside on the disk in the hard-disk bay because of the chance that the disk bay will be removed is less than that of a bootable hard disk located in one of the multi-bay. Thus, by treating the hard disk bay and the multi-bay as devices in accordance with the predetermined IPL order and by performing automatic device sensing and remapping if necessary, the present invention allows the user to dynamically insert and remove data storage devices without requiring the user to update the IPL order.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. Pat. No. 5,822,600, entitled "DYNAMIC HIBERNATION TIME IN A COMPUTER SYSTEM," by William C. Hallowell and Brian C. Fritz, filed concurrently herewith;

U.S. Pat. No. 5,684,382, entitled "IMPROVED CONTROL OF COMPUTER AC ADAPTER OUTPUT VOLTAGE VIA BATTERY PACK FEEDBACK," by Brian C. Fritz, William C. Hallowell, Thomas Sawyers, Norman D. Stobert, Robert F. Watts, and Michael E. Schneider, filed concurrently herewith;

U.S. application Ser. No. 08/684,420, entitled "MULTI-FUNCTION POWER AND KEYBOARD CONTROLLER," by David J. Delisle, William C. Hallowell and Patrick R. Cooper, filed concurrently herewith;

U.S. Pat. No. 5,805,882, entitled "FLASH ROM PROGRAMMING," by Patrick R. Cooper, David J. Delisle and Hung Q. Le, filed concurrently herewith;

U.S. Pat. No. 5,794,054, entitled "FLASH ROM SHARING," by Hung Q. Le and David J. Delisle, filed concurrently herewith;

U.S. Pat. No. 5,793,995, entitled "BUS SYSTEM FOR SHADOWING REGISTERS," by Dwight D. Riley and David J. Maguire, filed concurrently herewith;

U.S. Pat. No. 5,954,809, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. Pat. No. 5,943,500, entitled "LONG LATENCY INTERRUPT HANDLING AND INPUT/OUTPUT WRITE POSTING," by David J. Maguire and James R. Edwards, filed concurrently herewith;

U.S. Pat. No. 5,748,911, entitled "SERIAL BUS SYSTEM FOR SHADOWING REGISTERS," by David J. Maguire and Hung Q. Le, filed concurrently herewith;

U.S. Pat. No. 5,864,688, entitled "APPARATUS AND METHOD FOR POSITIVELY AND SUBTRACTIVELY DECODING ADDRESSES ON A BUS," by Gregory N. Santos, James R Edwards, Dwight D. Riley and David J. Maguire, filed concurrently herewith;

U.S. Pat. No. 5,781,748, entitled "TWO ISA BUS CONCEPT," by Gregory N. Santos, James R. Edwards, Dwight D. Riley and David J. Maguire, filed concurrently herewith;

U.S. Pat. No. 5,761,460, entitled "RECONFIGURABLE DUAL MASTER IDE INTERFACE," by Gregory N. Santos, David J. Maguire, William C. Hallowell and James R. Edwards, filed concurrently herewith; and U.S. Pat. No. 5,873,000, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
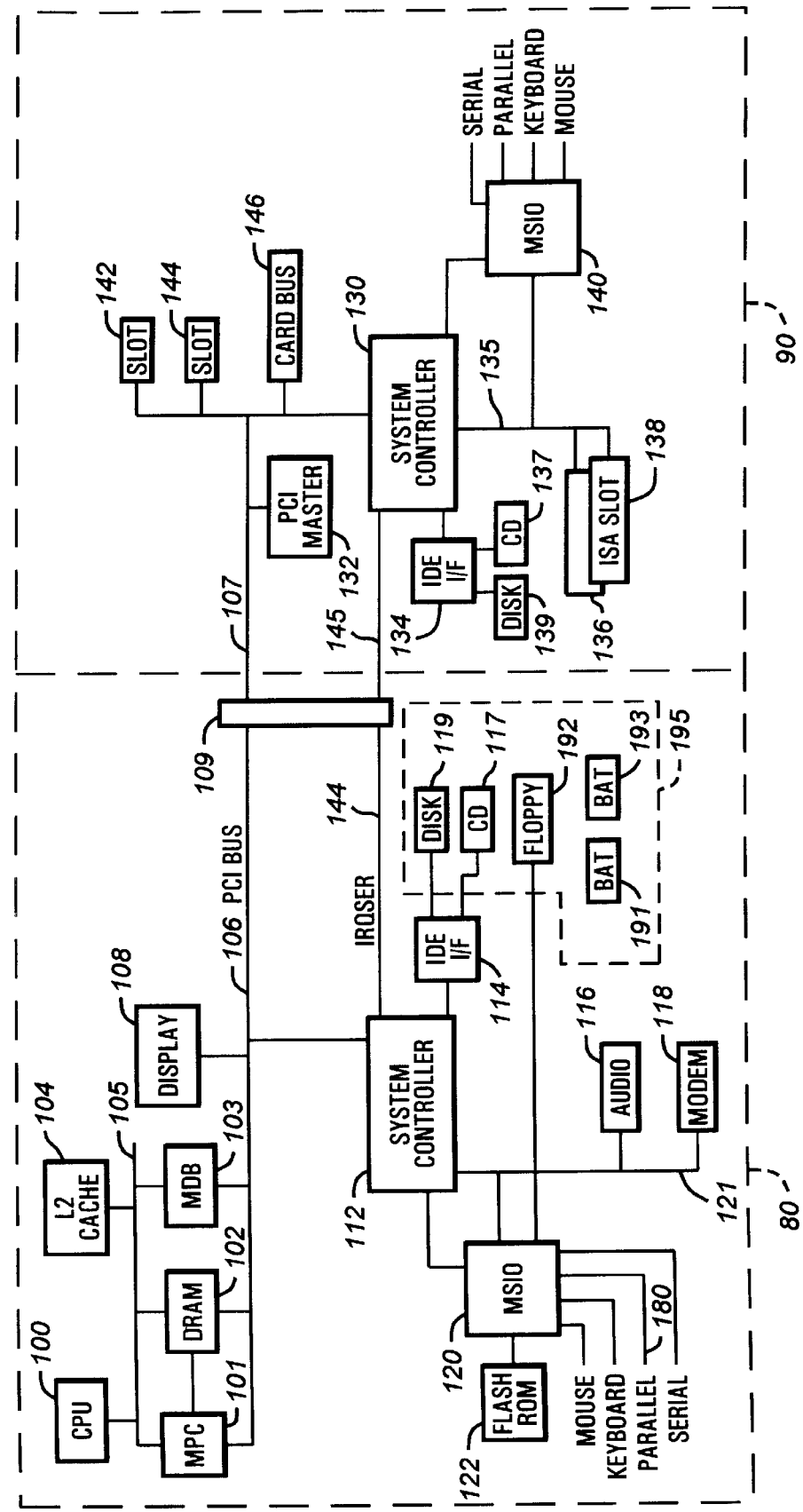
FIG. 1 is a block diagram of a computer system having multi-bay adapted to accept one or more bootable data storage devices in accordance with the present invention.

Turning now to the drawings, FIG. 1 is a computer system S according to the present invention is shown. In FIG. 1, the system. S comprises a portable computer 80 and an expansion base unit 90. Within the portable computer 80, a CPU 100 and a level two (L2) cache 104 are connected to a high speed local bus 105. The processor 100 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A display 108 is also connected to a PCI bus 106.

The PCI bus 106 is also connected to a system controller 112. The system controller 112 is a PCI to ISA bus bridge which also provides various support functions distributed between the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio board 116 and a modem 118 as conventionally present in PC systems to provide sound and data communication capabilities for the system S via a first ISA interface 121. The system controller 112 is also connected to an IDE interface port 114 for driving one or more peripheral devices such as hard disk drives, preferably a CD-ROM player 117 and a disk drive 119. The peripheral devices such as the disk drives typically store boot data used during the initial power up of the computer system. Further, the system controller 112 provides a single pin output to support a interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. The MSIO provides a floppy interface port for driving one or more floppy drives 192. Additionally, the MSIO 120 provides a parallel port 180, a serial port, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card bus interface 146 for accepting expansion cards. Also connected to the expansion PCI bus 107 is a second system controller 130, which is preferably a second integrated circuit of the same type as the system controller 112. The system controller 130 is configured to be the slave upon power up. As a slave, the write posting buffer is not available in the system controller 130. The system controller 130 is connected to the expansion PCI bus 107 and the interrupt serial bus 145. The system controller 130 supports additional drives 137 and 139 through an the IDE interface 134. The system controller 130 also supports an ISA bus 135 which is connected to one or more ISA slots 136–138. The system controller 130 is further connected to a second MSIO device 140, which provides a secondary parallel port, serial port, keyboard interface and mouse interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

The expansion base unit 90 is typically powered using AC power. Thus, the power source on the expansion base unit 90 is a traditional power supply with a disable input to place the power supply into a low power mode so as to be compliant with the "Green PC" guidelines issued by the U.S. Energy Department. The portable computer 80, on the other hand, faces a number of challenges in managing its power sources. In the portable computer, three power planes exist: a VCC0 plane which is connected to a coin cell (not shown). The VCC0 plane is connected to the power inputs of a sensitive electronics such as the volatile RAMs and the real time clock. The VCC0 plane is intended to supply backup voltage supply to devices when they are in a powered down mode with very little current consumption so that even the coin cell could last a reasonably long time. The portable computer 80 also has a VCC1 plane which principally provides power to a 8051 microcontroller 174 located in the MSIO 120 for managing power and for handling keyboard events. Finally, the portable computer 80 has a VCC2 plane with 5V and 12V carriers to provide power to the portable computer 80 when the user places the portable computer 80 in an ON state or a STANDBY state.

The portable computer 80 receives power from battery packs 191 and 193. The battery packs 191 and 193 may be a conventional Nicad or Lithium rechargeable battery or they may be consumable, one-time use type of battery. Additionally, the battery packs 191 and 193 may be a smart battery which offers power management, precise charge control, accurate capacity monitoring and extensive data logging, and can communicate battery information to the microcontroller 174 located within the MSIO device 120 which ultimate communicates such information to the CPU 100. Together, the hard disk 119 is located in a hard disk bay of the portable computer 80, while the CD-ROM player 117, the battery packs 191 and 193, and the floppy drive 192 is interchangeably located in the multi-bay 195.

Figure 2:
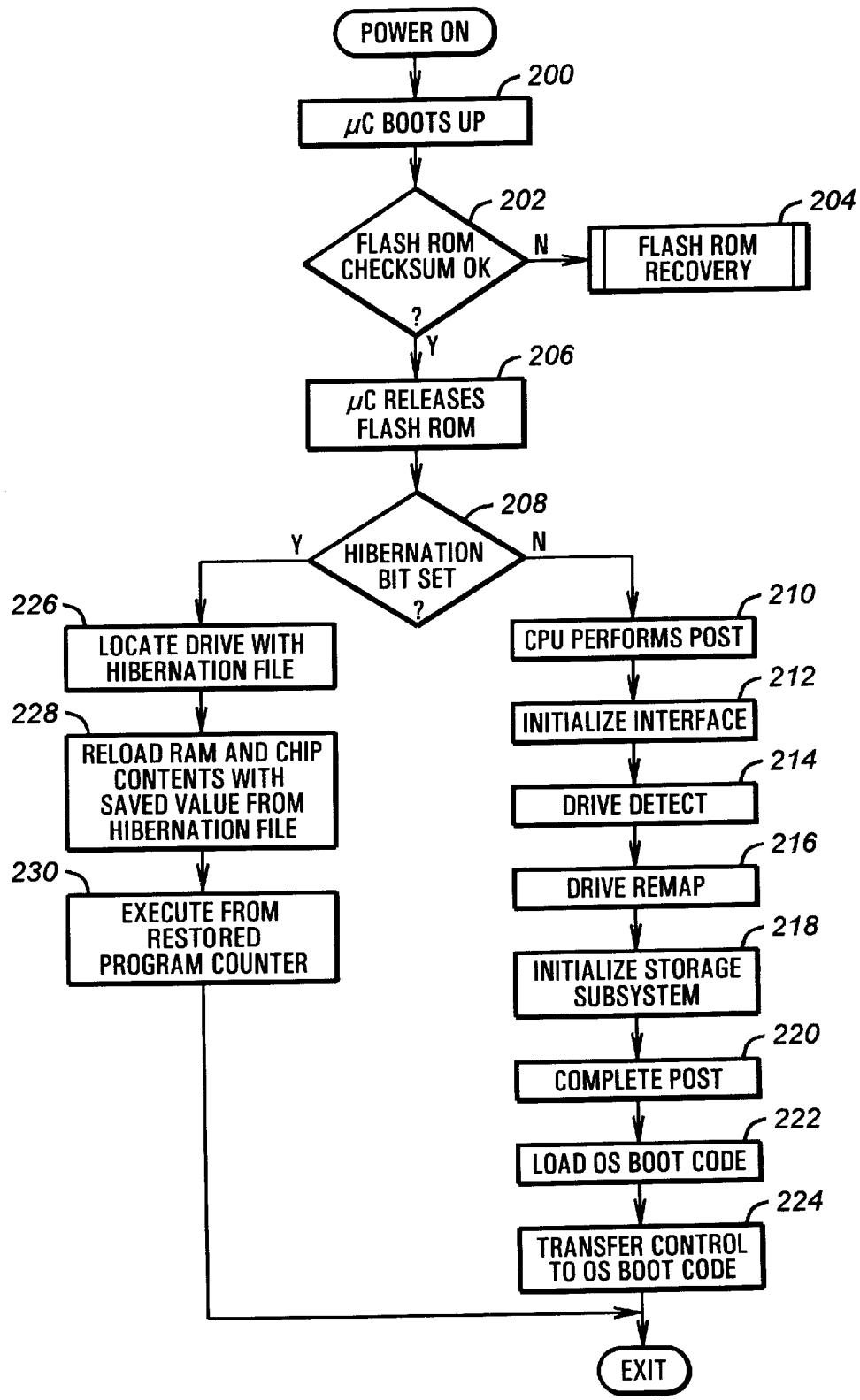
FIG. 2 is a flow chart of a power-on sequence to be executed by the computer system of FIG. 1.

Turning now to FIG. 2, the process for powering-on the computer system of FIG. 1 is disclosed in more detail. In FIG. 2, upon entry to the power-on routine, a microcontroller (not shown) located in the MSIO device 120 (FIG. 1) boots up first in step 200. Preferably, the microcontroller is an 8051 compatible microcontroller. In step 200, the microcontroller boots from its internal ROM and performs various low level system tests. Next, in step 202, the microcontroller checks if the content of the flash-ROM 120 is acceptable in step 202. If the content of the flash-ROM 120 has been corrupted, the routine of FIG. 2 performs a flash-ROM 120 recovery routine in step 204. The flash-ROM 120 recovery routine of step 204 is discussed in more detail in the previously incorporated-by-reference application entitled "FLASH-ROM PROGRAMMING".

Alternatively, in the event that the flash-ROM 120 passes the checksum test, the routine of FIG. 2 causes the microcontroller to release the flash-ROM 120 to the CPU 100 in step 206. From step 206, the CPU 100 handles the processing of the rest of the routine of FIG. 2. In step 208, the routine of FIG. 2 checks if a hibernation bit has been set in a non-volatile memory, indicating that the portable computer system 80 has previously been placed into a hibernation mode to conserve battery power. If not, the routine proceeds from step 208 to step 210 where the CPU 100 executes initial steps of a power-on-self-test (POST) routine in step 210. The POST routine tests the microprocessor, memory and other hardware components for their presence and correct operation. The POST routine also initializes various interrupt vector table entries with default values pointing to interrupt handler routines in the system BIOS. The POST routine also calls a user set-up program for configuring the hardware and loads an operating system from the selected boot disk drive into main memory after POST completes its operation.

From step 210, the routine of FIG. 2 initializes various data storage device interfaces in step 212, as disclosed in more detail in FIG. 3 below. From step 212, the routine of FIG. 2 performs a drive detection process in step 214. The drive detection process of step 212 is shown in more detail in FIG. 4. The drive detect in step 214 is necessary as the BIOS boot-up code is tailored to the particular type of boot device. For instance, a boot-up from a floppy disk is accomplished in a different sequence than a boot-up from a hard drive or from a CD-ROM player, as each device boots up using its own unique characteristics. Thus, the drive detect step 214 determines the appropriate type drive in the bay and stores that information in the drive characteristic table. From step 214, the routine of FIG. 2 performs a drive remapping, if necessary, in step 216. Step 216 essentially checks the hard drive specified in the IPL order to see if the drive is set as a master drive or not. In the event that the hard drive specified by the IPL order is configured as a slave, meaning that the drive cannot serve as a boot drive, the present invention reconfigures the drive as a master. Step 216 further checks if the IPL order specified a floppy drive. If necessary, the floppy drive is reconfigured as a floppy drive zero such that the floppy drive can boot the computer 80. The drive remapping routine of step 216 is shown in more detail in FIG. 5. The drive remapping step 216 is necessary as the BIOS boot specification 1.0 allows the user to perform an IPL from the first IDE hard disk drive, the first CD-ROM drive, or the first floppy drive. Thus, the user would need to reestablish the IPL order every time he or she changed any device in the multi-bay. The drive remapping step 216 automatically performs this step.

After the drive remapping step has been accomplished, the routine initializes the data storage devices in step 218 and continues on with the rest of the power-on self-test routine in step 220. In step 218, the initialization of the data storage devices consists of writing into the BIOS data storage area the identification and configuration of the particular data storage devices. Step 218 thus accounts for the particular characteristics of each data storage device. Further, from step 220, the routine boots up the portable computer system 80 in step 222. The routine of FIG. 2 then transfers control to the disk operating system (DOS) in step 224 before the routine of FIG. 2 is exited.

From step 208, in the event that the hibernation bit has been set, the routine transitions from step 208 to step 226 to determine the drive where the hibernation file is stored. Generally, the drive is assumed to be the hard disk drive in the hard disk bay of the portable computer 80, as the chance that a hard disk will be removed from the hard disk bay is less than the chance that the hard disk will be removed from the multi-bay. In the event that the hard drive is not present in the hard disk bay, the routine sends an error message prompting the user to insert the hard drive with the hibernation file into the hard bay. Alternatively, the present invention contemplates that step 226 performs a search to locate the hibernation file from the data storage device currently connected to the hard disk bay of the portable computer 80 and use that data storage device as the hibernation drive. Further, the present invention contemplates that the hibernation file search looks for a file with a signature characteristic indicating that the file is a hibernation file. From step 226, the routine reloads the RAM and the chip contents with the saved value from the hibernation file stored in the data storage device of step 226. At this point, the portable computer system 80 is restored to the identical state prior to its entry into the standby and hibernated state to conserve energy. Next, the routine executes from the last saved program counter in step 230 and the CPU 100 resumes processing.

Figure 3:
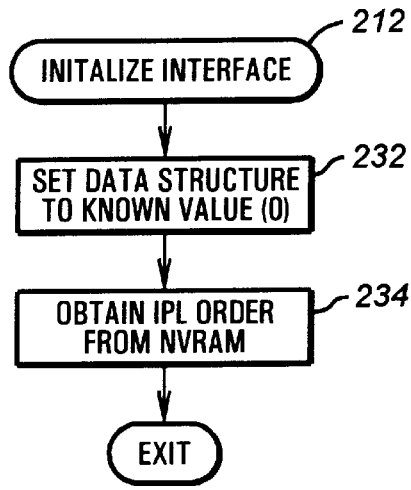
FIG. 3 is a flow chart illustrating the process of initializing the data storage devices of the computer system of FIG. 1.

Turning now to FIG. 3, the data storage device interface initialization process is shown. Upon entry to the initialize interface routine 212, the routine of FIG. 3 initializes the IDE and the floppy drive interfaces and leaves them in their default states. In step 232, the routine sets up a data structure and initializes the data structure to known values, preferably zero. Next, in step 234, the routine of FIG. 3 obtains the IPL order from a nonvolatile memory of the portable computer 80 and stores the IPL order in the data structure created and cleared in step 232. Preferably, the clearing of the data structure and the obtaining of the IPL order from the nonvolatile RAM is obtained by first gaining access into a protected portion of the DRAM 102 which is a shadowed version of the boot-up flash ROM 122. The flash ROM 122 is shadowed into the protected region of the DRAM 102 for performance reasons as well as for ease of modifying certain system parameters. Essentially, the routine of FIG. 3 requests access to the protected region. After gaining access to the protected region and performing steps 232 and 234, the routine returns control of the protected area to the computer system 80 so that application programs cannot accidentally modify the critical shadowed-region of the flash ROM 122.

Figure 4:
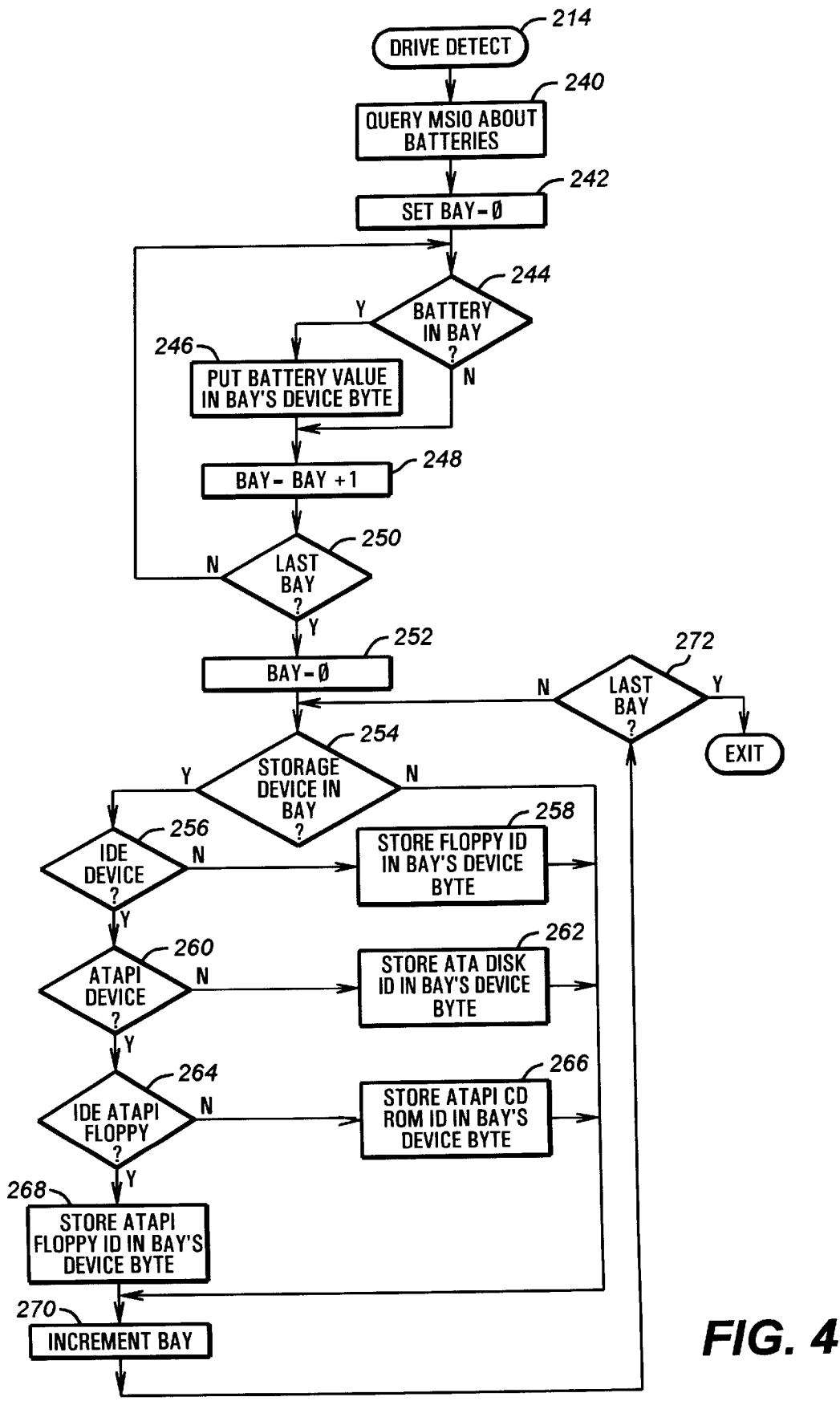
FIG. 4 is a flow chart of a process for detecting and identifying characteristics associated with each data storage devices of the computer system of FIG. 1.

Turning now to FIG. 4, the drive detect process 214 of FIG. 2 is shown in more detail. Upon entry to the drive detect routine 214, the routine first queries the mobile super I/O (MSIO) device 120 regarding the presence of battery packs 191 and 193 in step 240. Then, in steps 242 through step 250, the routine tests for the presence of the battery packs 191 and 193 in the bays. First, in step 242, the bay count is cleared. Next the routine 214 checks if one of the battery packs 191 and 193 exists in the current bay, as pointed to by the bay count, in step 244. If so, the routine 214 fits a battery identification value in the bay identification device byte of the data structure created in FIG. 3 in step 246. From step 246, or alternatively, from step 244 in the event that the battery does not exist in the current bay, the routine increments the bay count in step 248. Next, in step 250, the routine checks to see if it has reached the last bay. Preferably, the last bay is numbered as bay 4. If not, the routine loops back to step 244 to repeat the process of checking the next bay for the presence of battery packs 191 and 193.

From step 250, after all bays have been checked for the presence of battery packs 191 and 193, the routine prepares to check for the presence of data storage devices in the bays. Once more, the routine 214 clears the bay count in step 252. Next, the routine 214 checks if a data storage device exists in the current bay. If not, the routine transitions from step 254 to step 270 where the bay count is incremented to point to the next bay. Alternatively, if a data storage device exists in the current bay, the routine proceeds to step 256 where it checks if the device is an IDE device. If not, the routine identifies the devices as a floppy drive and stores the floppy identification in the bay's device byte in step 258. From step 258, the routine continues to step 270, where the bay is incremented to check the next bay.

Alternatively, if the device is an IDE device in step 256, the routine transitions to step 260 where it checks for the presence of an ATAPI device. If the device is not an ATAPI device, the routine identifies that the device is an ATA disk drive and stores the appropriate ATA disk drive identification in the bay's device byte in step 262. From step 262, the routine transitions to step 270, where the bay count is incremented. Further, if the device is an ATAPI device in step 260, the routine further tests if the device is an ATAPI floppy or an ATAPI CD-ROM. The test for the ATAPI device is performed using an ATAPI reset request to the device. The identification is retrieved subsequently from the ATAPI identification register, as previously discussed. If the ATAPI identification registers indicate positively that the device is an ATAPI device, the routine 214 of FIG. 4 next determines whether or not the IDE ATAPI device is an ATAPI floppy drive which is capable of storing 120 MB per floppy diskette, or a CD-ROM player. The distinction of the ATAPI floppy drive versus the CD-ROM player is made by checking if the word "FLOPPY" has been written into the ATAPI identify buffer. Thus, if the device is not an IDE ATAPI floppy, the routine appreciates that the device is an ATAPI CD-ROM player and stores the appropriate ATAPI CD-ROM identification value in the bay's device byte in step 266. From step 266, the routine increments the bay count in step 270. Alternatively, if the device is an IDE ATAPI floppy drive, the routine simply stores the ATAPI floppy identification value in the bay's device byte in step 268.

From steps 258, 262, 266 or 268, the routine 214 increments the bay count in step 270 to point to the next bay. Next, the routine 214 checks if all bays have been analyzed in step 272. If not, the routine loops back to step 254 to test the next bay. Alternatively, if the last bay has been tested in step 272, the routine 214 simply exits FIG. 4. In this manner, the routine 214 of FIG. 4 detects the particular floppy disk, hard disk, or CD-ROM player type in the bay using a process of elimination. For instance, if a storage device exists in the bay and if it is not an IDE device, the routine 214 appreciates that the device under test is a floppy device. Alternatively, if the device is an IDE device, the routine further checks if the device is an IDE ATAPI device or not. If not, the device is identified as a regular ATA disk drive. Finally, if the device is an IDE ATAPI device, the routine determines that the device is an ATAPI floppy if the word "FLOPPY" is present in the ATAPI identify buffer, and in the absence of such, determines that the device is an ATAPI CD-ROM player.

Figure 5:
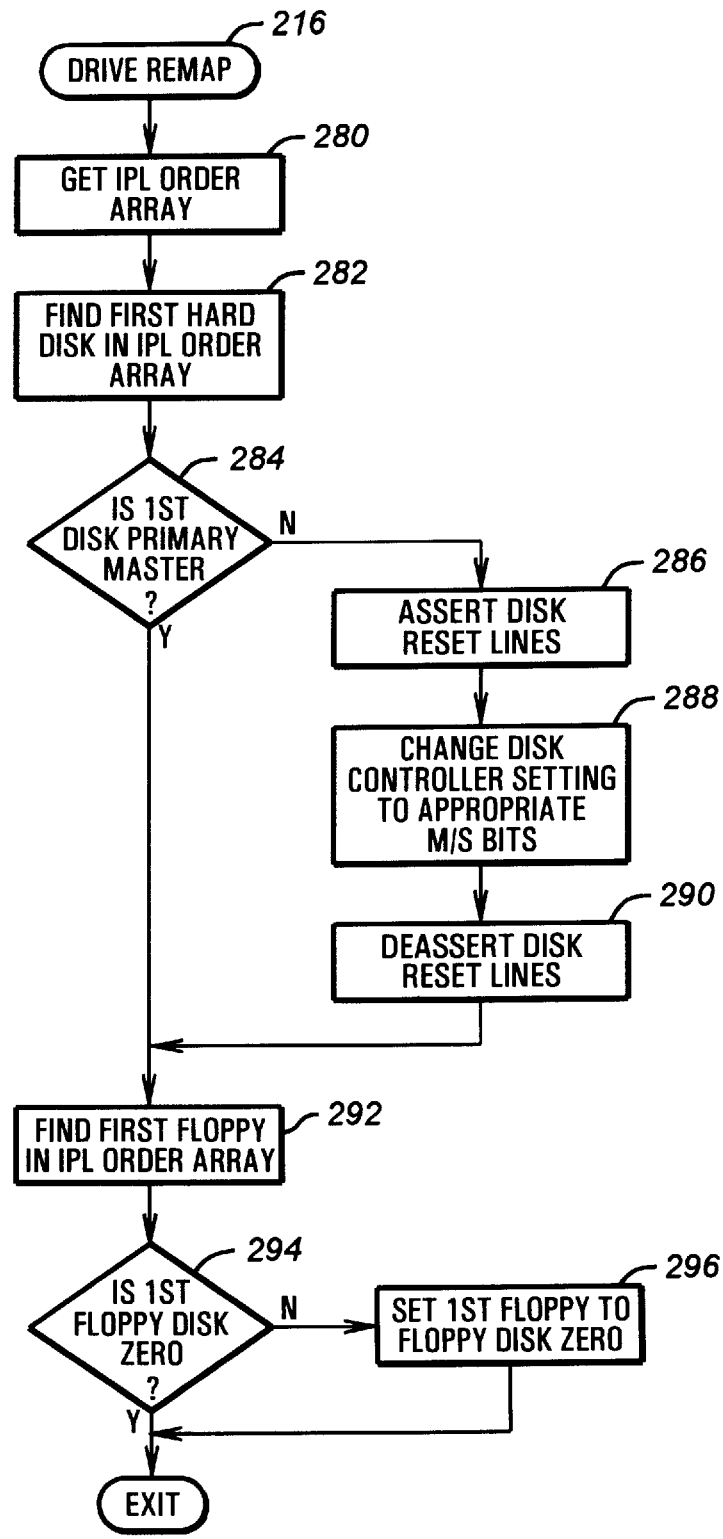
FIG. 5 is a flowchart of a process to remap the data storage devices of the computer system of FIG. 1.

Turning now to FIG. 5, the process for remapping drives in step 216 of FIG. 2 is shown in more detail. Upon entry to the drive remap routine 216 of FIG. 5, the routine retrieves the IPL order array from the protected DRAM 102 area in step 280. Then, the routine 216 locates the first hard disk in the IPL order array in step 282 in the respective bay and makes that hard disk a primary IDE master disk drive, as accomplished in steps 284 and 290. In step 284, if the bay containing the hard disk drive is not already set as a bay with a primary master drive, the routine performs a drive remapping process for the hard drives in steps 286–290. The detection of the primary/slave designation in step 284 is performed by accessing a hard drive control register located in the IDE hard drive electrical interface of the system controller 112. This register controls the IDE hard drive master/slave selection, primary/second channel selection and the IDE hard drive on-indicator signals. A description of the hard drive control register is shown below:

| Bits | R/W | Description |
| --- | --- | --- |
| 7 | R/W | Hard Drive B Master/Slave Select<br>1 - Hard Drive B Master<br>0 - Hard Drive B Slave |
| 6 | R/W | Hard Drive A Mastet/Slave Select<br>1 - Hard Drive A Master<br>0 - Hard Drive A Slave |
| 5 | R | Channel 2 Hard Drive Select. This bit shadows bit 4 the Drive/Head Register on the drives connected to the Primary IDE channel.<br>1 - Drive 1 selected<br>0 - Drive 0 selected |
| 4 | R | Channel 1 Hard Drive Select. This bit shadows bit 4 the Drive/Head Register on the drives connected to the Secondary IDE channel.<br>1 - Drive 1 selected<br>0 - Drive 0 selected |
| 3 | R/W | Hard Drive B Channel Select<br>1 - Connect Secondary Channel (and IRQ15) to Hard Drive B<br>0 - Connect Primary Channel (and IRQ14) to Hard Drive B |
| 2 | R/W | Hard Drive A Channel Select<br>1 - Connect Secondary Channel (and IRQ15) to Hard Drive A<br>0 - Connect Primary Channel (and IRQ14) to Hard Drive A |
| 1 | R/W | Hard Drive B On/Off<br>1 - Hard Drive B On<br>0 - Hard Drive B Off |
| 0 | R/W | Hard Drive A On/Off<br>1 - Hard Drive A On<br>0 - Hard Drive A Off |

In addition to the hard drive control register, a corresponding hard drive status register is provided by the system controller 112. This register provides the present status for hard drives A and B, whose description is provided below:

| Bits | R/W | Description |
| --- | --- | --- |
| 7–4 | R | Reserved |
| 3 | R | 0 - Hard Drive B Present<br>1 - Hard Drive B Not Present |
| 2–1 | R | Reserved |
| 0 | R | 0 - Hard Drive A Present<br>1 - Hard Drive A Not Present |

More details on the system controller 112 is disclosed in the previously-incorporated-by-reference application entitled "RECONFIGURABLE DUAL MASTER IDE INTERFACE."

From step 284, if the first disk drive is not configured as the primary master drive, the routine 216 performs the drive remapping by first asserting the disk drive reset line in step 286. From step 286, the routine 216 changes the disk controller master/slave select lines setting, as described in the above table, to turn on the appropriate master/slave bits in step 288. Finally, the routine deasserts the disk reset line in step 290. The deassertion of the disk reset line causes the controller within the hard drive to exit its reset mode with the correct master/slave setting.

In the event that the first disk drive is already the primary master in step 284, or alternatively, from step 290, the routine 216 of FIG. 5 performs a remapping of the floppy drives, if necessary. In step 292, the routine 216 finds the first floppy drive in the IPL order array previously retrieved in step 280. If the first floppy is not the floppy disk zero in step 294, the routine sets the first floppy to floppy disk zero in step 296 The setting of the first floppy to be the floppy disk zero is performed simply by writing into a configuration register of system controller 112. Alternatively, in the event that the first floppy disk is already floppy disk zero, or from step 296, the routine 216 completes the drive remapping process and exits FIG. 5.

Figure 6:
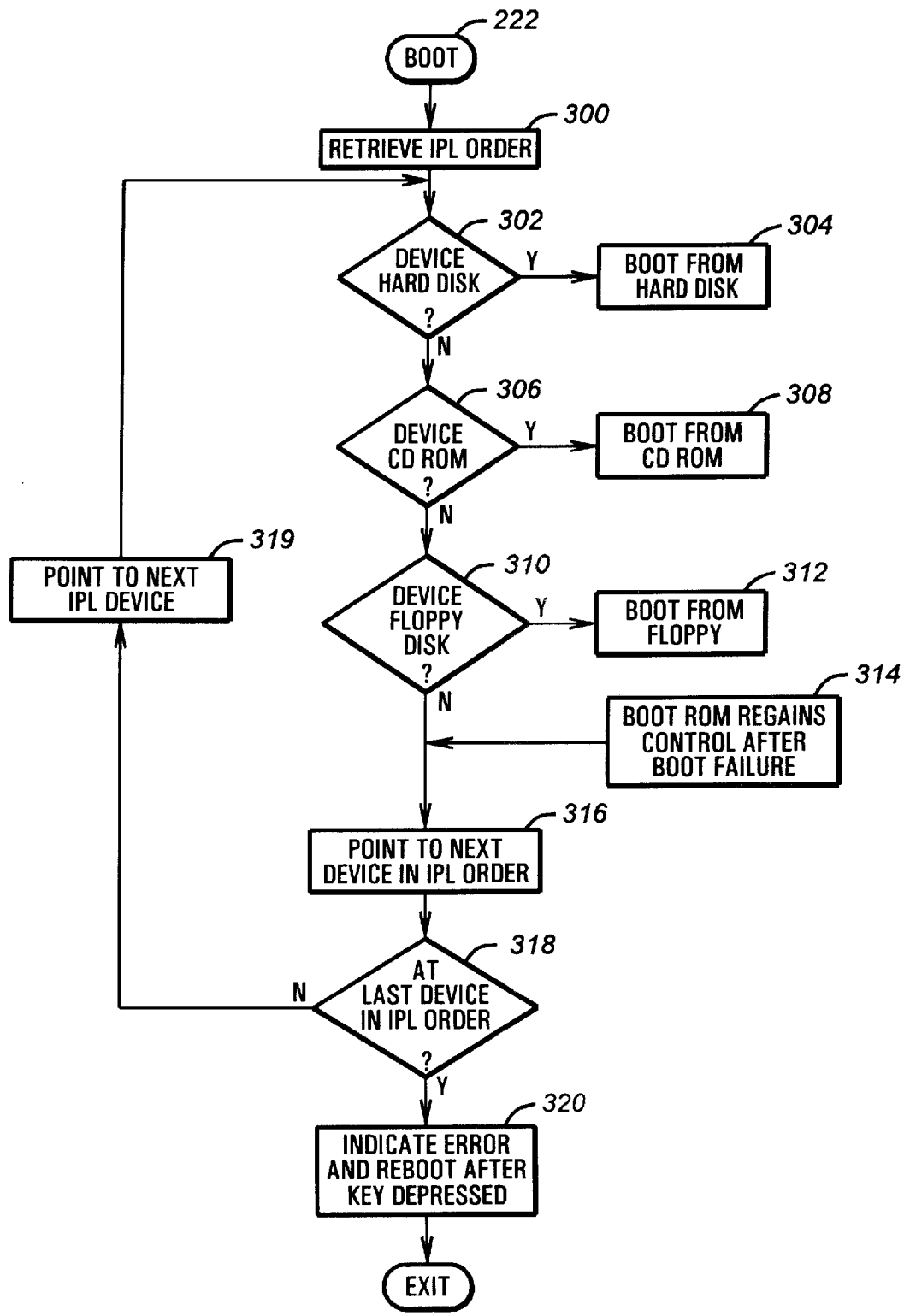
FIG. 6 is a flow chart of the process for booting the computer system of FIG. 1.

Referring now to FIG. 6, the routine to perform the boot process 222 of FIG. 2 is disclosed in more detail. Upon entry to the routine 222 of FIG. 6, the IPL order is retrieved from the DRAM 102 in step 300. Next, the routine 222 of FIG. 6 determines if the device is a hard disk drive, based on the drive information byte array detected during the drive detection process 214 of FIG. 2 and FIG. 4. If so, the routine boots from the hard disk drive in step 304.

Alternatively, if the device is not a hard disk, the routine 222 checks if the device is a CD-ROM in step 306. If so, the routine 222 boots from the CD-ROM in step 308. From step 306, in the event that the device is not a CD-ROM, the routine checks if the device is a floppy disk drive in step 310. If so, the routine 222 of FIG. 6 boots from the floppy drive in step 312. From steps 304, 308 or 312, in the event that a boot failure occurs, a mechanism in the boot ROM allows the computer system 80 to regain control after the boot failure in step 314.

In step 314, assuming that the boot process fails, the BIOS provides an indication to the user of a boot failure and further vectors to an INT 18. INT 18 is used to handle boot failure time-outs. INT 18 subsequently jumps to INT 19 which transitions to step 316 of FIG. 6. In step 316, the routine points to the next device in the IPL order. From step 316, the routine checks if it is at the last device in the IPL order in step 318. If not, the routine transitions to step 319 where it increments the pointer to the next IPL device before it jumps back to step 302 to attempt to boot from the next IPL device.

From step 318, in the event that the portable computer has attempted to boot from all devices specified in the IPL order, the routine indicates an error to the user and waits for a key depression to reboot the portable computer 80 using the boot routine 222 once more in step 320. After step 320, the routine 222 exits FIG. 6.

Figure 7:
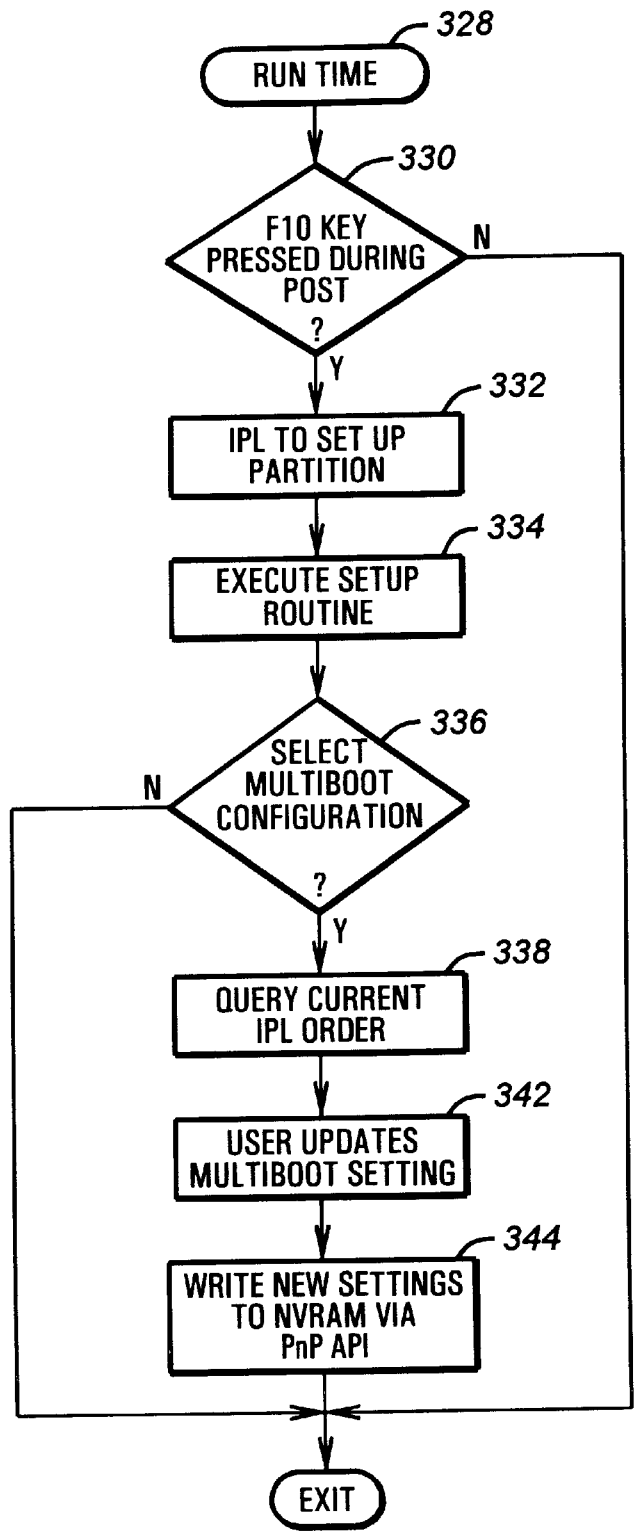
FIG. 7 is a flow chart of the process for updating of a multi-boot setting of the computer system of FIG. 1.

Turning now to FIG. 7, the process for updating the multi-boot setting after the portable computer 80 has booted up is disclosed in more detail. Upon entry to the run time routine 328, the routine 328 checks if an F10 key had been depressed during the POST procedure of step 330. If not, the user does not desire to modify the multi-boot setting and the routine 328 simply exits FIG. 7. Alternatively, if the F10 key had been depressed in step 330, the routine 328 moves to step 332 where it executes from a set-up partition. The set-up partition is a Compaq hard disk partition allowing set up routines to be stored in predetermined tracks on a boot disk drive rather than to be incorporated into the flash ROM 122. The principal advantage of the set-up partition is that the set-up partition allows the user to examine and modify the set-up configuration using the more user-friendly Windows interface.

From step 332, the routine 328 executes the set-up procedure in step 334. Next, after entering the set-up procedure, the routine 328 checks if the user has selected the multi-boot configuration option in step 336. If not, the routine 328 simply exits FIG. 7. Alternatively, if the multi-boot configuration set-up has been selected, the routine 328 queries the current IPL order and displays this order to the user in step 338. The routine 328 then allows the user to update the multi-boot setting in step 342. Next, in step 344, the routine writes the new setting to the nonvolatile RAM via a Plug and Play (PnP) API. Finally, from steps 330, 336, or 344, the routine exits FIG. 7.

Figure 8:
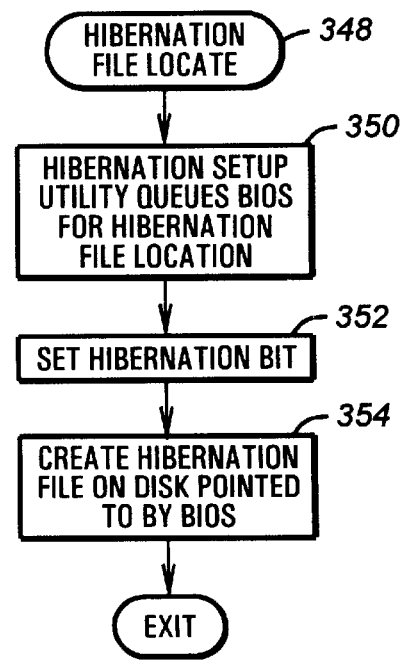
FIG. 8 is a flow chart of the process for determining the location of a hibernation file for the computer system of FIG. 1.

Referring now to FIG. 8, the process for determining the hibernation file location is disclosed. In FIG. 8, a hibernation set-up utility routine 348 queries the BIOS for the location of the hibernation hard disk in step 350. Next, the routine 348 sets the hibernation bit in step 352 and subsequently the routine creates the hibernation file on the disk pointed to by the BIOS in step 354. From step 354, the routine 348 simply exits FIG. 8.

As shown above, the present invention treats the hard disk bay and multi-bay as devices in accordance with the IPL order. Thus, the user is saved from having to update the IPL order every time a change is made to the multi-bay device. Hence, the present invention allows a user to select the IPL order for selecting the priority in attempting to boot this from the system's current bootable devices. Further, the present invention eliminates the need for the user to reestablish the IPL order every time he or she changes a device in any of the multi-bay.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An apparatus adapted to execute boot code in a computer, said computer having a plurality of bays adapted to accept battery packs and data storage devices, said boot code being located on one or more data storage devices, each of said data storage devices having a device characteristic, said computer having a predetermined initial program load (IPL) order for sequencing the delivery of said boot code from said data storage devices to said computer, said apparatus comprising:

a drive detector adapted to identify the device characteristic of each of said data storage devices;

a drive remapper coupled to said drive detector, said drive remapper resetting the characteristic of said data storage devices to enable said data storage devices to supply the boot code to the computer; and a boot-up selector coupled to said computer, said drive detector and said drive remapper, said boot-up selector adapted to select the data storage device listed in the IPL order as the boot data storage device.

2. The apparatus of claim 1, wherein said boot-up selector further comprises a sequencer coupled to said data storage devices, said boot-up selector selecting one of said data storage device as a boot drive in the order specified by the IPL order.

3. The apparatus of claim 1, wherein the device characteristic is a master/slave configuration of the data storage device.

4. A method for selecting a boot drive from a plurality of data storage devices in a computer, said computer having a plurality of bays adapted to accept said data storage devices, said method comprising the steps of:

obtaining an initial program load order (IPL), said IPL specifying the order of booting said data storage devices;

detecting the characteristic of each of said data storage devices;

if said data storage device specified by said IPL is disabled from supplying boot code to the computer, resetting the characteristic of said data storage device to enable said data storage device to supply boot code to the computer; and booting up the computer using said data storage device in the order specified by said IPL.

5. The method of claim 4, wherein said booting step further comprises the step of sequentially booting from each data storage device listed in said IPL order.

6. The method of claim 4, wherein said booting step further comprises the step of booting from a data storage device selected from a set consisting of floppy disk drives, hard disk drives, and CD-ROM players.

7. The method of claim 4, wherein the device characteristic is a master/slave configuration of the data storage device.

8. A computer system, comprising:

an expansion base unit;

a portable computer adapted to be coupled with said expansion base unit, said portable computer having a plurality of bays adapted to accept battery packs and data storage devices, said portable computer booting from a boot code located on one or more data storage devices, each of said data storage devices having a device characteristic, said portable computer having a predetermined initial program load (IPL) order for sequencing the delivery of said boot code from said data storage devices to said portable computer, said apparatus comprising:

a drive detector adapted to identify the device characteristic of each of said data storage devices;

a drive remapper coupled to said drive detector, said drive remapper resetting the characteristic of said data storage devices to enable said data storage devices to supply the boot code to the portable computer; and a boot-up selector coupled to said portable computer, said drive detector and said drive remapper, said boot-up selector adapted to select the data storage device listed in the IPL order as the boot data storage device.

9. The computer system of claim 8, wherein said boot-up selector further comprises a sequencer coupled to said data storage devices, said boot-up selector selecting one of said data storage device as a boot drive in the order specified by the IPL order.

10. The computer system of claim 8, wherein the device characteristic is a master/slave configuration of the data storage device.

* * * * *